United States Patent
Jiang

(10) Patent No.: US 7,734,177 B2
(45) Date of Patent: Jun. 8, 2010

(54) SYSTEM, METHOD AND TERMINAL PROCESSING APPARATUS FOR OPTICAL FIBER TRANSMISSION

(75) Inventor: Shumiao Jiang, Guangdong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 925 days.

(21) Appl. No.: 10/565,850

(22) PCT Filed: Jul. 26, 2004

(86) PCT No.: PCT/CN2004/000866

§ 371 (c)(1),
(2), (4) Date: Sep. 26, 2006

(87) PCT Pub. No.: WO2005/011158

PCT Pub. Date: Feb. 3, 2005

(65) Prior Publication Data

US 2007/0065078 A1     Mar. 22, 2007

(30) Foreign Application Priority Data

Jul. 26, 2003   (CN)  ................................ 03 1 33300

(51) Int. Cl.
    *G02B 6/36*     (2006.01)
(52) U.S. Cl. ........................... 398/58; 398/45; 398/138; 398/139; 370/351; 385/76
(58) Field of Classification Search ............. 398/48–64, 398/67; 370/352–360, 378–379
See application file for complete search history.

(56) References Cited

U.S. PATENT DOCUMENTS 4,450,554 A * 5/1984 Steensma et al. .............. 398/54

(Continued)

FOREIGN PATENT DOCUMENTS

CN      2545652 Y      4/2003

(Continued)

OTHER PUBLICATIONS http://searchnetworking.techtarget.com/sDefinition/0,,sid7_gci1018154,00.html (PDF named CWDM).*

*Primary Examiner*—Ken N Vanderpuye
*Assistant Examiner*—Tanya Ngo
(74) *Attorney, Agent, or Firm*—Conley Rose, P.C.; Grant Rodolph

(57) ABSTRACT

Disclosed by the present invention is a system and method for optical fiber transmission. The switching portion of the present invention adopts the single-layered integrated switching technology so as to ensure a relatively simple and easy maintenance compared with the switching in a traditional communication network where said switching is made in the service network layer and the bearer network layer, respectively. Moreover, the present invention implements data transmission via optical fiber throughout the entire telecommunication system such that demands for bandwidth resources are satisfied during the whole data transmission process and the QoS (Quality of Service) of different services as well as rapid and un-blocking switching of the services are ensured in the telecommunication system. Therefore, the present invention can implement on-demand allocation of bandwidth resources, enhancing the flexibility in network resource management while a subscriber can apply for bandwidth resources based on its demand, which satisfies the individual needs of the user.

30 Claims, 5 Drawing Sheets

U.S. PATENT DOCUMENTS

| | | | |
|---|---|---|---|
| 5,140,585 A * | 8/1992 | Tomikawa | 370/354 |
| 5,224,108 A * | 6/1993 | McDysan et al. | 370/522 |
| 5,550,818 A * | 8/1996 | Brackett et al. | 370/395.51 |
| 5,708,961 A | 1/1998 | Hylton et al. | |
| 5,727,051 A * | 3/1998 | Holender | 379/112.05 |
| 5,857,092 A * | 1/1999 | Nakamura et al. | 710/62 |
| 5,880,864 A | 3/1999 | Williams et al. | |
| 5,884,148 A * | 3/1999 | Bilgic et al. | 455/74.1 |
| 6,636,529 B1 * | 10/2003 | Goodman et al. | 370/469 |
| 7,031,343 B1 * | 4/2006 | Kuo et al. | 370/473 |
| 7,031,465 B1 * | 4/2006 | Dibble et al. | 379/418 |
| 2002/0196784 A1 * | 12/2002 | Masuda | 370/355 |
| 2003/0053168 A1 * | 3/2003 | Yum | 359/124 |
| 2003/0081619 A1 | 5/2003 | Phillips et al. | |
| 2003/0090759 A1 | 5/2003 | Glance | |
| 2003/0120799 A1 * | 6/2003 | Lahav et al. | 709/236 |
| 2006/0018334 A1 * | 1/2006 | Cho et al. | 370/432 |
| 2006/0146855 A1 * | 7/2006 | Kani et al. | 370/430 |

FOREIGN PATENT DOCUMENTS

| | | |
|---|---|---|
| JP | 08-065649 | 3/1996 |
| JP | 08-102747 | 4/1996 |
| JP | 09-200172 | 7/1997 |
| JP | 11-284623 | 10/1999 |
| JP | 2001-292154 | 10/2001 |
| JP | 2002-057998 | 2/2002 |
| JP | 2003-110585 | 4/2003 |
| WO | 97/47119 | 12/1997 |
| WO | WO 01/74077 | 10/2001 |
| WO | 02/063834 A1 | 8/2002 |
| WO | WO 02073962 A2 | 9/2002 |
| WO | WO 03/017603 | 2/2003 |

* cited by examiner

SYSTEM, METHOD AND TERMINAL PROCESSING APPARATUS FOR OPTICAL FIBER TRANSMISSION

CROSS-REFERENCE TO RELATED APPLICATIONS

This application claims priority to Patent Cooperation Treaty (PCT) Application No. PCT/CN2004/000866 filed Jul. 26, 2004, entitled, AN OPTICAL FIBER TRANSMISSION SYSTEM, A METHOD FOR IMPLEMENT OF OPTICAL FIBER TRANSMISSION AND TERMINAL PROCESSING EQUIPMENT, which claims priority to Chinese Patent Application Serial No. 03133300.1 filed Jul. 26, 2003, all of the disclosure of which is hereby incorporated by reference in its entirety.

FIELD OF THE TECHNOLOGY

The present invention generally relates to network communication technology, and more particularly, to a system, terminal processing apparatus and method for optical fiber transmission.

BACKGROUND OF THE INVENTION

At present, optical fiber transmission has been widely used in telecommunication system. In access layer, the commonly used modes are "optical fiber+category 5 cabling LAN (Local Area Network)", "optical fiber+xDSL (x Digital Subscriber Line)" or "optical fiber+Coaxial-Cable", in which all User Equipments (UEs) connect with optical fiber through cables rather than directly. Therefore, these modes can never completely shake off the limitations caused by transmission bandwidth of cables and make full use of the advantages of the optical fiber in bandwidth. Along with the parallel developments of voice, data and video services, bandwidth limitations of transmission cable have become a big obstacle to the development of telecommunications.

The "optical fiber+category 5 cabling LAN" mode provides subscribers with 10M/100M Ethernet network interface to support broadband data access, where the transmission distance of category 5 cabling is no longer than 200 meters.

The "optical fiber+xDSL" mode provides, via a copper twisted-pair, subscribers with interface of which the rate is from several hundred kbps to less than one hundred Mpbs, where the transmission distance is often less than 10 km and the transmission rates and transmission distances of different types of DSL (Digital Subscriber Line) are diversified.

The "optical fiber+Coaxial-Cable" mode provides subscribers with broadband services, which are mainly cable television (CATV) signals, as well as voice and data transmission in some countries through coaxial cable, where the rate is up to 40 Mbps but the transmission distance is also less than 10 km.

Therefore, in all the present optical fiber transmission modes, optical fiber is used for data transmission only in part of a communication network while other low bandwidth transmission media still exist between UE and optical fiber. As a result, on one hand, compared with the transmission bandwidth of optical fiber, the bandwidth of less than 155M of these low bandwidth transmission media such as copper cables can guarantee neither enough bandwidth that is needed for data transmission in the entire communication networks nor upgrading and capacity expansion of the communication network; on the other hand, the transmission distance of less than 10 km of these low bandwidth transmission media can also gravely limit the development of communication networks.

In order to overcome the shortcomings in the above commonly used optical fiber transmission modes, the FTTH/D (Fiber to the Home/Desktop) concept is put forward. At present, the major technique that is used in FTTH/D is BPON (Broadband Passive Optical Network). In terms of transfer protocol and transmission rate BPON can be further divided into APON (ATM Passive Optical Network), EPON (Ethernet Passive Optical Network) and GPON (Gigabit-capable Passive Optical Network).

The APON is one kind of optical fiber transmission technology that is based on ATM (Asynchronous Transfer Mode); APON system comprises OLT (Optical Line Terminal) at the service side, ONU (Optical Network Unit) at the subscriber side and ODU (Optical Distribution Unit) between said ONU and OLT, where ODU provides one or more optical transfer paths between the OLT and the ONU.

The EPON technology implements optical fiber transmission based on Ethernet and mainly comprises OLT, ONU and POS (Passive optical Splitter/Coupler); wherein, said OLT locates at CO (Central Office) and may provide interfaces between EPON system and the kernel data, video and telephone network of the service providers; the ONU locates at Customer Premises Equipment (CPE), and provides interfaces between the EPON and the data, video and telephone network of the subscriber; while said POS is a passive device that links the OLT and the ONU with the functions of distributing downlink data and converging uplink data.

Therefore, the present optical fiber transmission technology has provided relatively mature methods of data transmission through optical fiber and reliable technical supports for widespread applications of optical fiber transmission in network communication systems. However, the problems that need to be solved in applications of optical fiber transmission in an entire network communication system include not only the problem of how to transfer data in the optical fiber, but also that of how to packet the data to be transferred in a user terminal, how to distribute the data when the user terminal receives a data packet that contains different types of data, how to switch the data after the data have been transferred through the devices at the network side and etc.

In an existing communication network, optical fiber transmission technology is used for only part of the network. If optical fiber transmission is to be used in the entire communication network, adaptive adjustment is needed for the packet processing at the user terminal, for data switching after the data are transferred to CO, and for other corresponding functions in the existing network.

In an existing communication network, the switching portion of the network corresponding to optical transmission unit can only implement switching of bearer network level granularity, for instance, switching of VC4 or VC12, rather than the switching of service network level granularity, which means that the switch unit in the existing optical fiber transmission process can only accomplish part of the switching task in communications. The service network level granularity is the minimum bandwidth unit that is transferred and switched in the service layer of an existing communication network, and cannot be recognized, multiplexed or de-multiplexed by the bearer network, for instance, a transmission network with the granularity of 2M cannot recognize, multiplex or de-multiplex the 64 Kbps cross granularity in a voice service network. Moreover, the terminals in existing optical transmission networks are usually access devices or switching equipments rather than real client terminal devices.

An existing communication network can be divided into two layers, the bearer network and the service network, wherein the bearer network can be further divided into circuit switched SDH/WDM (Synchronous Digital Hierarchy or Wave Division multiplexing) transmission network and packet/cell switched IP/ATM (Internet Protocol/Asynchronous Transfer Mode) data network. An SDH/WDM transmission network can provide carrier-class services with excellent QoS (Quality of Service) and security characteristics while the complicated layered network architecture of its switching portion increases the cost of network construction and maintenance.

The above transmission network may be divided into access transmission layer, convergence transmission layer and core transmission layer, as shown in FIG. 1. The access transmission layer implements the access of dispersed subscribers to the local switch while convergence transmission layer and core transmission layer accomplish transmission across switches and transmission of long distance services. Therefore there is switching operation in each transmission layer.

The core switching layer of the above-said IP data network comprises high-rate routers and takes the form of Mesh network mostly while the convergence layer and access layer thereof comprise edge routers, three-layered switches, broadband access servers, and two-layered switches. So the network architecture is very complex.

The service networks in an existing communication network can be divided into voice, data and video service networks, which are above the bearer network and implement the processing and switching of the service layer, and the devices thereof include voice switches, two and three-layered data switches (L2/3), routers, and video switching platforms. Existing service networks usually construct and maintain their own networks respectively. In one word, layered network architecture and separate networking of the three major services make the overall networking cost and overall maintenance cost of existing communication networks remain high while problems in QoS of IP networks lowers the transmission quality of real-time services including video phone, video conference, and etc.

Therefore, applications of optical fiber transmission technology at present have the following problems:

1, the complicated layered network architecture makes the overall cost of network construction and maintenance remain high;

2, the separate construction of the layer of voice, data and video service networks in network communications brings about higher overall cost of network construction and maintenance, resulting in wastes caused by redundant network construction;

3, the relatively low bandwidth transmission media existing in the entire communication network, compared with the transmission bandwidth of optical fiber, can not meet the bandwidth requirement of subscribers, making it impossible to guarantee the QoS in network communications, for instance, there are relatively serious time delay and jittering in videophone and videoconference services;

4, the commonly used ring structure in network communications has relative poor protecting effects on data transmission;

5, neither application for bandwidth resources based on each call nor allocation of bandwidth resources on demand is supported in existing network communications, making it impossible to satisfy the diversified needs of users;

6, the electric magnetic radiation generated from copper transmission cables commonly used in communication networks damages the surrounding environment while surrounding electric magnetic radiation can also interfere with the signals transferred through copper cables.

SUMMARY OF THE INVENTION

The invention provides a system and a method for optical fiber transmission such that optical fiber transmission could be implemented at relatively lower cost in the entire network communication system and the demand for reliable and rapid transmission could be satisfied.

It is another aspect of this invention to provide a terminal processing unit for the optical fiber transmission system such that optical fiber based transmission could be implemented at the side of user equipment (UE).

The present invention can be implemented as follows:

An optical fiber transmission system, comprises a terminal processing unit, an optical transmission unit, and a switch unit, wherein the terminal processing unit, connecting with user equipment (UE), is used for encapsulating and converting the signal to be transferred from the UE into an optical signal and sending the optical signal to the optical transmission unit; as well as for de-encapsulating the signal from the optical transmission unit and sending the signal to UE;

the optical transmission unit, connecting with the terminal processing unit and the switch unit respectively, is used for multiplexing the encapsulated signal from the terminal processing unit and sending the signal to the switch unit via optical fiber; as well as for de-multiplexing the signal transferred from the switch unit via optical fiber and then sending the de-multiplexed signal to the terminal processing unit;

the switch unit, the input and output thereof connected with the optical transmission unit, is used for receiving the multiplexed signal at the input side from the optical transmission unit, de-multiplexing the signal into an electric signal before determining the transmission destination of the signal, and sending out the signal; at the same time, for multiplexing the signal to be sent from the output side thereof to the optical transmission unit, converting the multiplexed signal into an optical signal, and sending out the signal.

An optical fiber transmission method, comprises a transmitting process from UE to a remote terminal and a receiving process from a remote terminal to UE, wherein The transmitting process comprises, A, a terminal processing unit encapsulating the signal from UE, converting the signal into an optical signal and then sending the signal to an optical transmission unit;

B, an optical transmission unit multiplexing the encapsulated signal, and then sending the signal to a switch unit via optical fiber;

C, the switch unit converting the multiplexed signal into an electric signal and de-multiplexing the signal, determining the transmission destination of the de-multiplexed signal and sending the signal; and the receiving process comprises, D, the switch unit multiplexing the signal that needs to be sent to the optical transmission unit, converting the multiplexed signal to an optical signal and then sending to the destination optical transmission unit via the optical fiber;

E, the optical transmission unit de-multiplexing the optical signal from the switch unit, and then sending to the terminal processing unit;

F, the terminal processing unit converting the optical signal from the optical transmission unit into an electric signal, de-encapsulating the electric signal based on the signal type thereof, and then sending the signal to the UE.

A terminal processing unit used for an optical fiber transmission system, comprising: a signal codec module, a terminal frame processing module, and a terminal electric/optical signal processing module, wherein the signal codec module encodes various signals sent by UE and sends the signals to the terminal frame processing module while decoding the digital signals from the terminal frame processing module and sending the signals to the UE;

the terminal frame processing module receives the digital signals sent by the signal codec module and sends the signals to the terminal electric/optical signal processing module after encapsulating the signals while de-encapsulating the electric signals from the terminal electric/optical signal processing module and sending the signals to the signal codec module;

the terminal electric/optical signal processing module converts the optical signal from an optical transmission unit into the electric signal and sends the signal to the terminal frame processing module while converting the electric signal from the terminal frame processing module into an optical signal and sending the signal to the optical transmission unit.

As seen from the scheme described above, the present invention provides an integrated optical fiber transmission system and an implementing method thereof, realizing the transmission based on optical fiber throughout the entire telecommunication system, guaranteeing the needs for transmission bandwidth resources during the whole transmission process and the QOS (Quality of Service) of various services in the telecommunication system, and moreover, meeting requirement for rapid and blockless switching of various services.

The present invention also supports bandwidth resource application at UE, enabling bandwidth resource allocation on demand. As a result, the flexibility of network resource management is improved such that a subscriber can apply for bandwidth resources according to his needs and the customized demand thereof can be met.

A gateway unit is configured as well according to the present invention so reliable interconnection of data transmission between communication networks based on different protocols is achieved.

The present invention has following advantages compared with the prior art:

1, the single-layer networking adopted in the present invention simplifies the construction of communication networks, thereby greatly reducing the overall cost of setting up an optical fiber transmission network;

2, in accordance with the present invention, voice, data and video services are merged on one network for transmission, greatly reducing the overall cost of constructing networks separately as in the prior art, and at the same time, avoiding redundant constructions;

3, in accordance with the present invention, QoS is guaranteed by the transmission bandwidth and the cross capacity, respectively, for instance, in accordance with the present invention, visible time-delay of the picture on a video phone can be eliminated, which means pictures on the phone could be smooth and natural like those on common TV;

4, Mesh networking architecture is adopted in the present invention, which has much better protective effects on data transmission than ring networking architecture in the prior art;

5, the present invention supports single-call-based application for bandwidth resources and bandwidth resource allocation on demand, making it possible for subscribers to choose bandwidth resources according to the needs thereof;

6, in accordance with the present invention, optical fiber is used for transmission throughout the network such that the transmission can neither be interfered by the surrounding environment nor can it produce electromagnetic radiation in the surrounding environment.

EMBODIMENTS OF THE INVENTION

Figure 1:
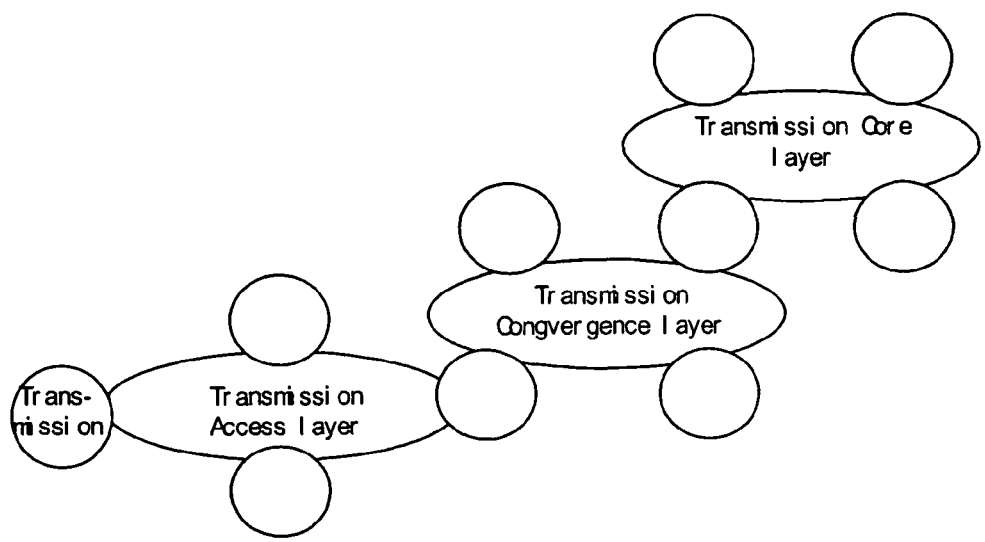
FIG. 1 is a schematic diagram of the architecture of a transmission network in the prior art.
Figure 2:
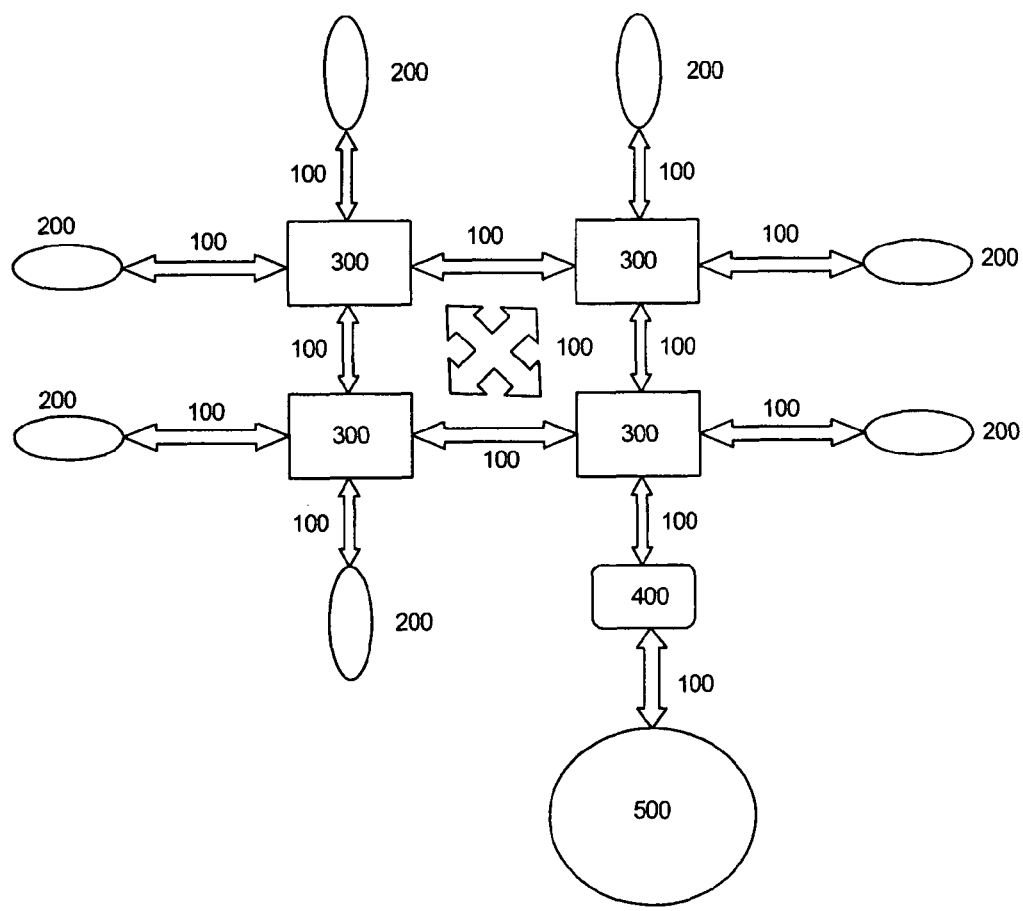
FIG. 2 is a schematic diagram of the architecture of the optical fiber transmission system in accordance with the embodiment of present invention.

The optical fiber transmission system in accordance with this embodiment of invention at least comprises three parts, a switch unit, an optical transmission unit and a terminal processing unit. Besides, under the circumstances of several types of communication networks coexisting, such as the case when an optical fiber transmission system needs to interconnect with traditional telephone network and television network, it is necessary to have a gateway unit that is used for implementing protocol conversion between the optical fiber transmission system and other types of networks, and the physical entity of the gateway can be integrated into the switch unit. FIG. 2 shows the architecture of the system according to the embodiment of present invention, where terminal processing unit 200 connects with switch unit 300 through optical fiber transmission unit 100 while different switch units 300 are interconnected with each other via optical fiber transmission unit 100 such that the signal of a subscriber can be connected to the system from one terminal processing unit 200, and then be sent to an corresponding subscriber through one or more switch units 300 connected with optical fiber transmission units 100; at the same time, switch unit 300 also interconnects with external network 500 via gateway unit 400 and optical fiber transmission unit 100 so as to implement the interconnection between the optical fiber transmission system and external network 500.

The switch unit is the core of the optical fiber transmission system and the input and output thereof connect with the optical transmission unit, respectively. The switch unit is for use in implementing the single-layer switching process of the transmission data, i.e. for use in receiving data sent by the optical transmission unit at the input side, determining the transmission destination of said data and sending the data after de-multiplexing; and at the same time, multiplexing the data that needs to be sent to the optical transmission unit at the output side and then sending the data to the corresponding optical transmission unit. The difference between the switch unit of a transmission network in the prior art and the switch unit in the embodiment of present invention is that the switching of the embodiment of present invention is done in the same layer and all the switching tasks that are needed by each communication in the service level and bear level are completed in a centralized way, thus simplifying the network architecture greatly while reducing the maintenance cost of the network.

Figure 3:
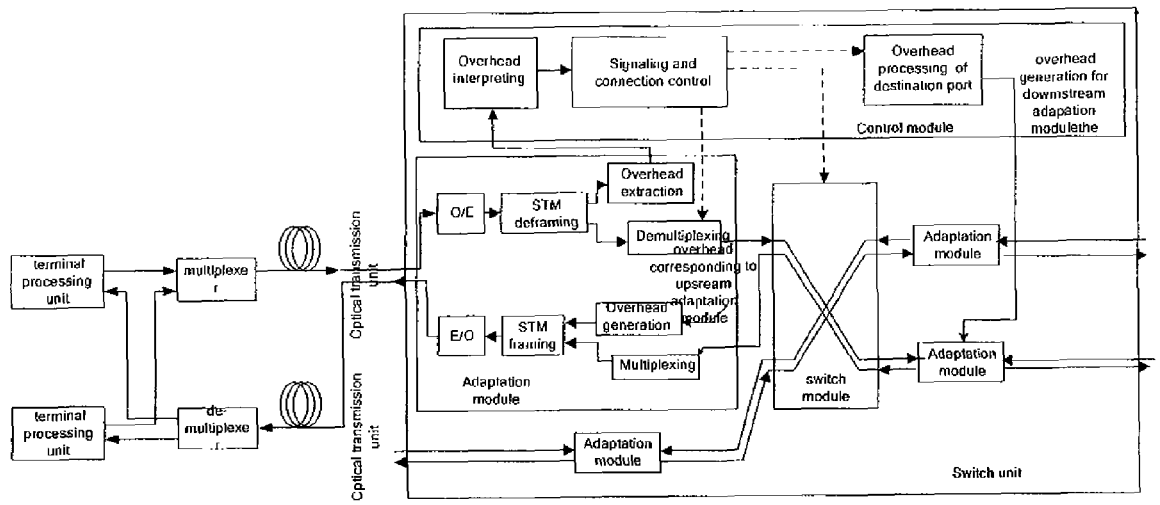
FIG. 3 is a schematic diagram of the architecture of the switch unit in accordance with the embodiment of present invention.

As shown in FIG. 3, the switch unit usually comprises an adaptation module, a control module and a switching module. The adaptation module is mainly to realize the rate adaptation function such that the service could enter the switching module at the rate desired by the subscriber; the control module is to implement the functions such as receiving/sending and processing signaling, call controlling, as well as establishing and deleting cross-connections; and the switching module is used for implementing commands sent by the control module, and performing circuit switching, or packet switching, or combination of the two, or full optical switching.

Each module comprised in the switch unit will be described in detail hereinafter with reference to FIG. 3.

The adaptation module, connecting with the optical transmission unit, sends the signal received from the optical transmission unit to the switching module after rate/format processing, and sends the control and management information in the signal to the control module, and at the same time, sends the signal received from the switching module to the optical transmission unit after the rate/format processing; in other words, this module is used for implementing the switching and adaptation between the service rate/format of the optical transmission unit and the service/format that participates in the switching within the switch unit.

The possible service types of the optical transmission unit include but are not limited to STM (Synchronous Transfer Mode)-1/4/16/64 synchronous digital signal, ATM (Asynchronous Transfer Mode) signal, FE (Fast Ethernet), GE (Gigabit Ethernet), ESCON (Enterprise System Connection), and FICON (Fiber Connection) while the service granularities that participate in the switching include but are not limited to VC12/3/4, ATM cell with fixed length, and packet slice with certain length, for instance, in a full circuit-switched switch unit with the cross granularity of VC12, if the STM-1 service is sent from the optical transmission unit, first optical-electric conversion and then de-multiplexing and de-mapping process from STM-1 to VC12 according to ITU-T G.707 are carried out while in the reversed direction, mapping and multiplexing process from VC12 to STM-1 will be carried out in accordance with ITU-T G.707 before performing electric-optical conversion.

Detailed structure of the adaptation module is shown in FIG. 3, which further comprises:

An overhead processing module, including an overhead extraction module and an overhead generation module, wherein the overhead extraction module extracts the overhead received from the frame processing module and sends the extracted overhead to the control module, and the overhead refers to the control and management information of messages; and the overhead generation module receives the control and management information of the upstream adaptation module in the switch unit sent by the control module, generates the corresponding overhead and then sends the overhead to the frame processing module.

A multiplexing/de-multiplexing module, including a de-multiplexing module and a multiplexing module, wherein the de-multiplexing module is used to receive the payload of the data sent by the frame processing module and send the data to the switch unit after the data are de-multiplexed into code stream, and the multiplexing module receives code stream sent from the upstream adaptation module in the switching module, and sends the code stream to the frame processing module after a multiplexing process.

A frame processing module, including STM framing module and STM de-framing module, wherein the STM framing module is used to receive the overhead sent by the control module in the upstream adaptation module as well as the processed payloads sent by the multiplexing/de-multiplexing module, and send the data to the electric/optical signal processing module after framing, and the STM de-framing module is used to de-compose the frame sent by electric/optical signal processing module and to send the decomposed overhead and payloads to the overhead processing module and the multiplexing/de-multiplexing module, respectively.

An electric/optical signal processing module, for use in implementing electric-optical signal conversion between the switch unit and the optical transmission unit, including E/O (electric-to-optical conversion) module and O/E (optical-to-electric conversion) module, wherein the E/O module receives the signal sent by the frame processing module, converts the received signal into an optical signal and then sends it to the optical transmission unit, and the O/E module is used for receiving optical signal sent by the optical transmission unit, converting the received signal into an electric signal and then sending the signal to the frame processing module.

The control module in the switch unit is for use in receiving the control and management information sent by the adaptation module, and making control and management of the switching process of the switching module based on the control and management information, i.e. for use in implementing such functions as the receiving/sending and processing of signaling, call control, as well as establishing and deleting of cross-connection. Kernel technology that the control module adopts includes but is not limited to the soft switching technology, i.e. an open standardized software established on an open computer platform and capable of implementing distributed communications, providing call control and signaling for the next generation network, and performing the harmonizing function between different networks and protocols.

In the case of FTTH, signaling that the control module processes can be transmitted in a specific channel or by a special package in the optical fiber: for the STM SDH signal, a specific unused overhead byte in an SDH frame may be used for transmission; for the FE/GE (Fast Ethernet/Gigabit Ethernet) signal, a special package may be used for transmission; and for the ATM signal, a specific byte of ATM OAM cell may be used for transmission.

The detailed structure of the control module is shown in FIG. 3, comprising:

an overhead interpreting module, receiving the overhead sent by the overhead extraction module of the overhead processing module, and then interpreting the overhead before sending it to a signaling and connection control module, i.e. converting the overhead byte into command messages and sending the command messages to a signaling and connection control module;

a signaling and connection control module, determining the corresponding control signaling after receiving the interpreted overheads sent by the overhead interpreting module, and sending the control signaling to the switching module companied with the output of the de-multiplexing module, meanwhile, sending the interpreted overheads to a destination-port overhead processing module so as to generate the overhead of destination port;

a destination-port overhead processing module, receiving the interpreted overhead sent by the signaling and connection control module, generating the overhead of destination port, and then sending the overhead to the overhead generation module in the downstream adaptation module as an overhead sent to the optical transmission unit.

The switching module in the switch unit is for use in determining the destination of the data sent by the adaptation module according to the control and management by control module, and sending the data to the destination, i.e. receiving the signal (i.e. payload) sent by the upstream adaptation module, determining the downstream adaptation module according to control and management information sent by the control module, and then sending the signal to the downstream adaptation module. The downstream adaptation module will then send the data out via the optical transmission unit.

After the detailed structure of the switch unit has been described, the functions of each functional module in the switch unit and the relations there between are described hereinafter with reference to the accompanying drawings.

The STM-N (N=1, 4 . . . ) optical signal from the optical transmission unit enters the adaptation module of the switch unit first. After the processing of the O/E (Optical-Electrical conversion) module, the signal is converted into digitalized STM-N code stream of electric signal, and the code stream enters the STM de-framing module for separating of the overheads and payloads. Then overhead blocks and payload blocks are outputted. The overhead block enters the overhead extraction module so as to extract the overhead bytes, then the overhead bytes are outputted into the overhead interpreting module within the control module, where the overhead bytes are converted into signaling and connection-control commands which can be used respectively for controlling the de-multiplexing module, establishing or deleting connections, and configuring the destination-port overhead bytes.

The payload block enters the de-multiplexing module, where it is de-multiplexed into code stream with specific rate according to the multiplexing status information of the control module, and then enters the switching module. The switching module is an unblock cross connection matrix controlled by the control module; and by searching in a "port-address mapping list" according to the destination address in the overhead bytes, the control module determines the destination port in the switching module corresponding to the call, and then establishes circuit connection from the source port to the destination port. The code stream flows out of the switching module from this circuit connection, enters the downstream adaptation module connected with the destination port, and is multiplexed according to the information of multiplexing status of the control module. The overhead generation module generates overhead bytes according to the destination-port overhead bytes processing module of the control module the overhead bytes and the multiplexed code stream form the STM-N frame structure together. After E/O conversion, the frame is outputted from the switch unit, and is transmitted to the optical transmission unit connected with the switch unit.

As the above-said switching module of the switch unit adopts circuit switching and the adaptation module carries out SDH-based multiplexing and de-multiplexing, QoS (Quality of Service) of the messages that are transmitted through the optical fiber transmission system with above implementing structure can be well guaranteed.

According to the embodiment of present invention, the switching module can implement the switching functions not only through circuit switching, but also through packet switching and full optical switching; the specific functional characteristics of different switching will be described hereinafter.

By the circuit switching, any type of service such as voice, data and image services is mapped at the terminal into the cross granularity (e.g. VC12) designated by the subscriber, and is switched as a whole based circuit connection in the cross network such that communications with terminals of the same type could be implemented. As the locations of different types of services within the granular bandwidth are known, different types of services can be separated and communications thereof with terminals in other service networks (for instance, communications with traditional telephony terminal) can be implemented through gateway equipment. The granularities used in circuit switching include but are not limited to 64 Kbps, VC12, VC3, and VC4;

The packet switching comprises the storing and forwarding mode of switching, i.e. first storing the messages from a subscriber in a storage device temporarily, then dividing the messages into a plurality of packets of certain length, putting labels of fixed format in front of each packet to indicate the source address, destination address and packet serial number thereof.

Both 100 Base fiber LAN switch and 100 Base fiber IP router with optical interface can act as the switch unit according to the embodiment of present invention, of which the principle is based on packet switching. The Ethernet switch can be either two-layer switch or three-layer switch.

A combination of circuit switching and packet switching comprises, logically, circuit switching and packet switching devices coexisting in one switch unit, and physically, separate entities; and the control module choosing circuit switching or packet switching according to the QoS level designated by the subscriber.

The optical transmission unit in the embodiment of present invention is used for transmitting messages between the terminal processing unit and the switch unit, between the switch unit and the switch unit, as well as between the switch unit and the gateway unit; i.e. the optical transmission unit connects with the terminal processing unit, the switch unit and the gateway unit, respectively, so as to multiplex the data packet sent by the terminal processing unit or the gateway unit, and send the multiplexed data to the switch unit via optical fiber; as well as de-multiplex the signal received from the switch unit via optical fiber, and send the de-multiplexed signal to the terminal processing unit or the gateway unit.

Detailed structure of said optical transmission unit comprises, an optical network unit, connecting with the terminal processing unit, receiving signal sent by the terminal processing unit and sending the signal to an optical allocation unit, meanwhile, sending the signal received from the optical allocation unit to the terminal processing unit;

an optical allocation unit, connecting between the optical network unit and an optical line terminal, for use in aggregated processing of the signals received from one or more optical network units and sending the processed signals to one optical line terminal, meanwhile, distributing the signal received from the optical line terminal to different optical network units;

an optical line terminal, connecting between the switch unit and optical allocation unit, for use in interaction between the optical allocation unit and the switch unit.

Said optical transmission unit comprises the unit implemented based on PON (Passive Optical Network), CWDM (Coarse Wave Division multiplexing), DWDM (Dense Wave Division multiplexing) or UWDM (Ultra Dense Wave Division multiplexing), i.e. it usually adopts multiplexing/de-multiplexing technologies that implement optical transmission based on PON, CWDM, DWDM, or UWDM. The optical transmission unit mainly consists of multiplexing/de-multiplexing portion and optical fiber links, of which the transmitting range can exceed that of a metropolitan area network and reach that of a wide area network, i.e. the range can be that of a long distance transmission. Since the CWDM and DWDM technology is fully developed, no description will be given here. Instead, a simple introduction will be made to the PON and UWDM technology.

Figure 4:
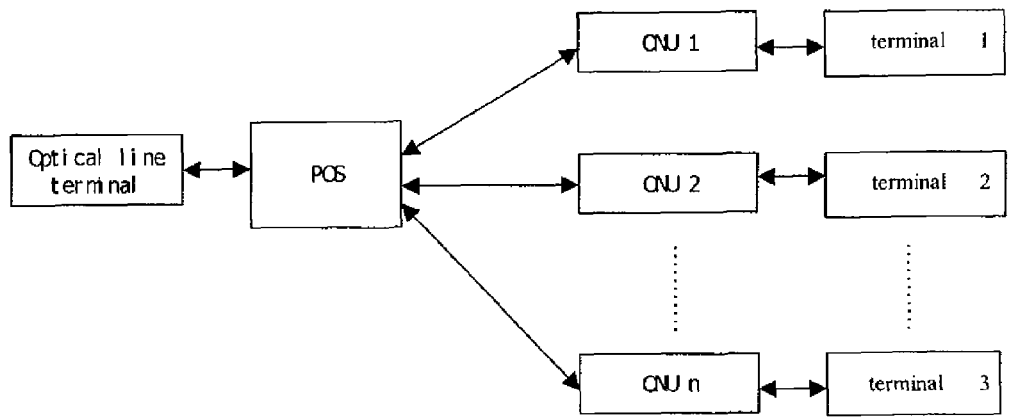
FIG. 4 is a schematic diagram of the architecture of the optical transmission unit in accordance with the embodiment of present invention.

The architecture of the optical transmission unit that is implemented based on PON is shown in FIG. 4, which usually includes OLT (Optical line terminal), POS (Passive optical splitter) and ONU (Optical network unit), wherein the POS implements functions of the optical allocation unit and the ONU implements functions of the optical network unit. The PON here may be a narrowband PON or a broadband PON, wherein a broadband PON may comprise EPON or APON depending on the type of technology employed. Taking EPON as an example, in the downlink direction, a service received from the OLT side is duplicated into identical service of multiple paths by POS, which are sent to all the ONU that connect with that branch; each ONU selects its services to transfer to the terminal connected with it according to given rules, and discards the services that do not belong to it, as shown in FIG. 4. In the uplink direction, TDM (Time Division Multiplexing) technology is adopted in management so as to avoid interference between information packets from different ONU, and each ONU is assigned with a special time slot. For instance, ONU-1 (Optical network unit1) information packet is transferred in the first time slot, ONU-2 (Optical network unit2) information packet is transferred in the second non-overlap time slot, and ONU-n information packet is transferred in the $n^{th}$ non-overlap time slot.

There are so far at least two schemes based on EPON technology: one is TDM based TDM-EPON (Time Division Multiplexing-Ethernet Passive Optical Network), of which the transmission range is up to 20 Km, one optical fiber accommodates up to 128 users, and the total bandwidth at most is from 622 Mbps to 2.4 Gbps. The other is Wave Division multiplexing based WDM-EPON (Wave Division multiplexing-Ethernet Passive Optical Network), of which the transmission range is up to 60 Km, one pair of optical fibers accommodates 16 users, and the total bandwidth can as high as 1.6 Gbps to 160 Gbps.

UWDM technology implements multiplexing for more than 1000 wavelengths by means of super stable laser locking technology, Ultra Dense WDM filtering and interleave technology. In the case of using multi-port interleaver, UWDM can even implement multiplexing for 1280 wavelengths. The UWDM technology can make full use of bandwidth resources of optical fiber, and can inter-work with DWDM system while allocation of one wavelength for each subscriber provides a solution to the security problem of service.

The terminal processing unit according to the embodiment of present invention is connected with UE for use in encapsulating and sending the signal to be transmitted from the UE to the optical transmission unit, and for use in de-encapsulating the signal received from the optical transmission unit and sending the signal to the UE. The terminal processing unit integrates video, audio and data, encapsulates whatever kinds of services into the specific bandwidth that the subscriber has presently applied for, and sends the service data as a whole to the remote UE.

During the evolution of a network, functions of a broadband terminal may be implemented by means of relatively simple optical terminals (conversion of video, audio and data into optical signal) together with traditional TV set, telephone set, or computer. In each communication operation, transmission bandwidth and size of cross granularity can be chosen by the subscriber according to the demand with help of system prompt. Meanwhile, the system separates the services, which have been put into packets by the terminal processing unit such that different types of services could be separated. When the Broadband terminal communicates with traditional telephone or data terminal, after the services are separated, the voice service or the data service can enter the traditional PSTN (Public Switched telephony network), Internet or other type of network through special gateways.

The terminal processing unit usually connects to the optical transmission unit by optical fiber with the rate of STM-1/4/16/64, or FE, GE etc. Under some special circumstances such as being blocked by mountain, river, or buildings, however, the terminal access may be implemented by multifarious seamless broadband access techniques, including but not limited to FSO (Free Space Optics communication), microwave communication, and etc.

Figure 5:
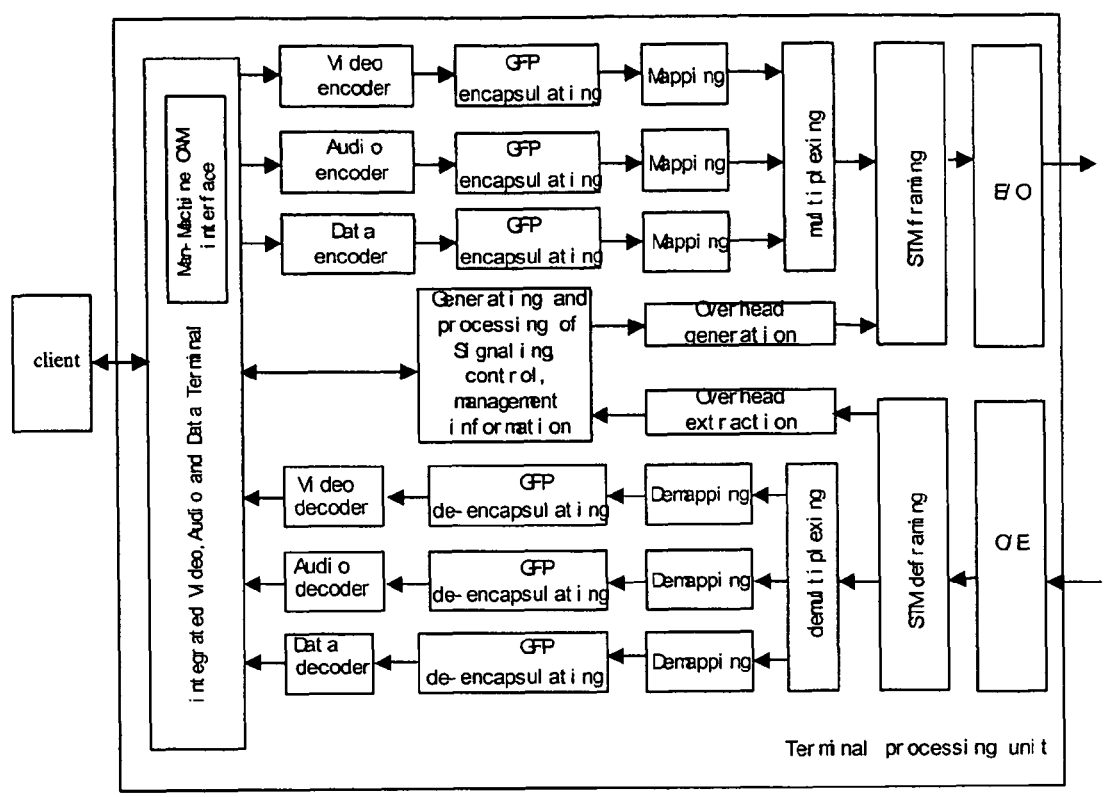
FIG. 5 is schematic diagram 1 of the architecture of the terminal processing unit in accordance with the embodiment of present invention.
Figure 6:
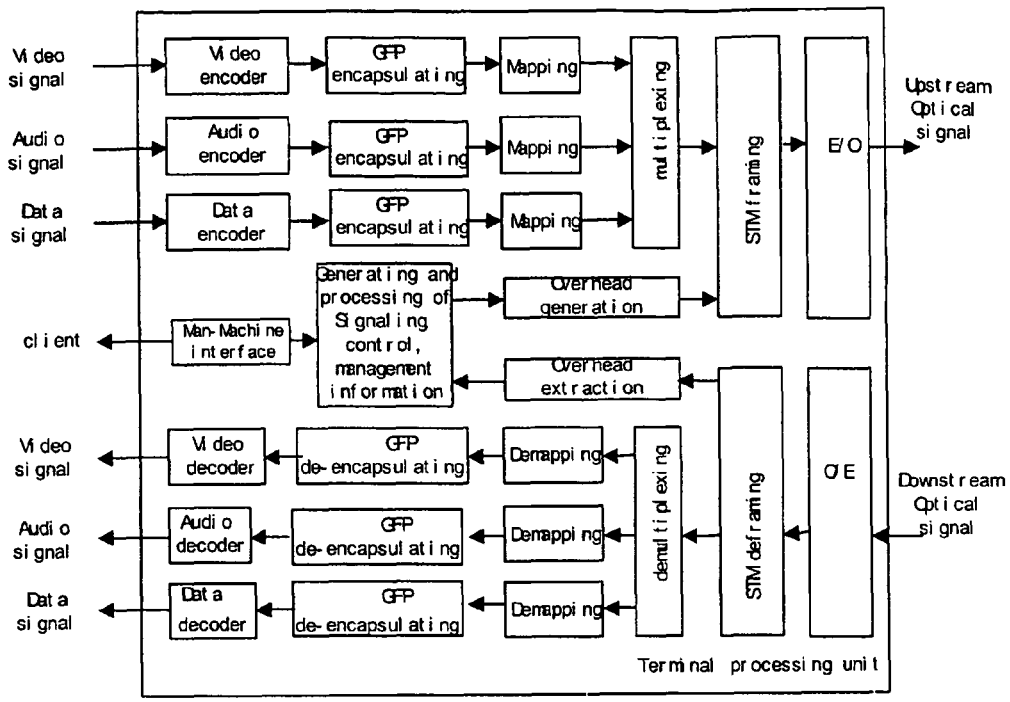
FIG. 6 is schematic diagram 2 of the architecture of the terminal processing unit in accordance with the embodiment of present invention.

The terminal processing unit is shown in FIG. 5 and FIG. 6, which specifically comprises:

a signal codec module: when the UE is an analog device, converting different analog signals sent by the UE to digital signals, and sending the encoded signals to a terminal frame processing module; at the same time, converting the digital signals received from the terminal frame processing module into analog signals, and sending the decoded signals to the UE; when the UE is a digital device, coding different signals sent by the UE and sending the encoded signals to the terminal frame processing module; at the same time, decoding the digital signals received from the terminal frame processing module, and sending the decoded signals to the UE; this module specifically comprising six function modules: video encoder, audio encoder and data encoder as well as video decoder, audio decoder and data decoder, used for the codec processing of the corresponding video signal, audio signal and data signal, respectively, wherein the six functional modules may introduce and output corresponding video signal, audio signal and data signal directly or through an integrated terminal for video, audio and data;

a terminal frame processing module: sending the digital signals received from signal codec module to a terminal electric/optical signal processing module after the encapsulating and framing process, at the same time, sending the electric signal received from the terminal electric/optical signal processing module to the signal codec module after de-framing and de-encapsulating; the module specifically comprising a GFP (Generic Framing Protocol) encapsulating module, a GFP de-encapsulating module, a mapping module, a de-mapping module, a multiplexing module, a de-multiplexing module, a STM framing module and a STM de-framing module, wherein the uplink signal is processed successively through the GFP encapsulating module, the mapping module, the multiplexing module and the STM framing module such that corresponding frames are generated and sent to the terminal electric/optical signal processing module while the downlink signal is processed successively through the STM de-framing module, the de-multiplexing module, the de-mapping module and the GFP de-encapsulating module such that the processing result is sent to the signal codec module; the video encoder, the audio encoder and the data encoder in this module correspond to a pair of GFP encapsulating module and mapping module, respectively, and to a pair of multiplexing module and STM framing module jointly while the video decoder, the audio decoder and the data decoder correspond to a pair of STM de-framing module and de-multiplexing module jointly and to a pair of de-mapping module and GFP de-encapsulating module, respectively;

a terminal electric/optical signal processing module: converting the optical signals received from the optical transmission unit into electric signals and sending the signals to the STM de-framing module in the terminal frame processing module, meanwhile, converting the electric signals sent by said STM de-framing module into optical signals and sending the signals to the optical transmission unit;

a man-machine interface module: forwarding the operation commands received from the UE to the control and management information processing module, at the same time, receiving and forwarding control and management information from the control and management information processing module to the UE;

a control and management information processing module: after receiving operation commands from the man-machine interface module, producing and sending corresponding control and management information to the terminal overhead processing module, meanwhile, receiving control and management information sent by the terminal overhead processing module, interpreting the information and sending it to the man-machine interface module;

a terminal overhead processing module: including overhead generation module and overhead extraction module, said overhead generation module receiving control and management information sent by the control and management information processing module, producing and sending corresponding frame overhead to the terminal frame processing module, at the same time, said overhead extraction module receiving frame overhead sent by the terminal frame processing module, extracting control and management information and sending the information to the control and management information processing module.

Said terminal processing module in the embodiment of present invention can be an optical terminal.

After the structure of said terminal processing unit is described, functions of each module and interrelationship among functional modules in said terminal processing unit will be described in detail hereinafter with reference to FIG. 5 and FIG. 6.

The upstream video signal sent by a video terminal such as video camera is converted into digital signal by compressing and encoding operation in the video encoder module, the rate of said digital signal can be different because different compressing and encoding standards can be employed by the video encoder module. Generally, the standards that the video encoder module can employ include MPEG-1, MPEG-2, MPEG-4, MPEG-7, ITU-T H.261, ITU-T H.263, ITU-T H.263+; when the video encoder module employs MPEG-1 standard (standard number is ISO/IEC 11172), transmission rate of the digital signal is no more than 1.5 Mbps; when the video encoder module adopts MPEG-2 standard (standard number is ISO/IEC 13818), transmission rate of the digital signal may be 80 Mbps, 60 Mbps, 15 Mbps or 4 Mbps depending on different quality levels; and the rest may be inferred; MPEG-4 or H.263+ corresponds to the rate of 24 kbps~64 kbps; H.261 corresponds to the rate of p×64 kbps; H.263 corresponds the rate of less than 64 kbps. The digital code stream outputted from the video encoder module will enter the GFP encapsulating module for GFP encapsulating and framing, of which the principle has been described in detail in ITU-T G.7041/Y.1303 (12/2001); the bandwidth resources for the code stream of GFP frame outputted from the GFP encapsulating module will be determined according to the bandwidth allocation policy that is default in system or customized by the subscriber through the man-machine interface module, and the code stream is mapped to one or more 64 kbps time-slots, or to a Virtual Container (e.g. VC-12) of a certain bandwidth or Virtual Connection of several Virtual Containers (e.g. VC-3-2V, i.e. Virtual Connection with two VC-3). Then the mapped code stream flows into the multiplexing module for time division multiplexing together with the code stream of the audio and data service portion after mapping operation, and the multiplexed code streams will enter the STM framing module together with the overhead bytes.

Said overhead comprises mapping and multiplexing status information, signaling information, and control and management information, and there will be only overhead interaction after a subscriber makes a communication application and before the communication is established successfully. The mapping and multiplexing status information includes the service type corresponding to the code stream of GFP frame, i.e. video, voice or data, the mapping bandwidth, and the location information after being multiplexed to the SDH frame structure, where the location information is generally represented by the numbers of the starting and ending time slots that the code stream occupies in the SDH frame structure. The mapping and multiplexing status information is written into the location of Section Overhead (SOH) byte in SDH frame structure to generate STM-N (N=1, 4, 16, ... ) code stream, and the STM-N code stream is converted through the E/O module into the upstream STM-N optical signal, which flows to the switch unit via optical fiber. There are detailed definitions and explanations on said mapping, Virtual Container, Virtual connection and multiplexing in ITU-T G.707/Y.1322 (10/2000).

The upstream audio signals sent by an audio terminal, such as a telephone set or a microphone, are converted into digital signals through compressing and encoding in the audio encoder module. The rate of said digital signal can be different because different compressing and encoding standards are employed by the audio encoder module. The standards that the audio encoder module may employ include PCM, MPEG-1, MPEG-2 and MPEG-2 AAC. The digital code stream outputted from the audio encoder module will enter the GFP encapsulating module and will be processed in the same way as the video part after GFP encapsulating and framing.

The upstream data signals sent by a data terminal such as a server may comprise data signals of any rate and any type, such as the data signals of Ethernet, Escon (Enterprise System Connection), Ficon (Fiber Connection), Fiber Channel and etc., and the data signals enter the data encoder module. Take the data signal involved in Ethernet as an example, the encoder module will perform the adaptation of Physical Layer (PHY) and the processing of Media Access Control layer (MAC), and complete the conversion of data stream from Manchester code, MLT-3 code or other codes to NRZ. The digital code stream outputted from the data encoder module will enter the GFP encapsulating module, and will be processed in the same way as the video part after GFP encapsulating and framing.

On the other hand, the optical signal STM-N coming from the downstream optical fiber is converted into digital STM-N electric signal code stream by the O/E module. The code stream enters the STM de-framing module for separation of overheads and payloads, and is outputted as overhead blocks and payload blocks, wherein the overhead blocks enter the overhead extraction module for the extraction of specific overhead bytes, and is outputted to the control and management information processing module for the processing and execution of related control and management information while the payload blocks enter the de-multiplexing module and is de-multiplexed into a code stream with specific rate of Virtual Container according to the multiplexing status information, the code stream flows in turn to the de-mapping module and is de-mapped into a code stream of GFP frame according to the mapping status information, the code stream of GFP frame enters the GFP de-encapsulating module, where the GFP header and overhead are removed and then a pre-decoding digital code stream is outputted, and the pre-decoding code stream enters the decoder module, where decoding is carried out and a service signal is outputted.

In the terminal processing unit, the three services will enter different SDH time-slots, respectively; therefore, no interference will exist among them. Moreover, the subscriber can also define the bandwidth and the time-slot position for each service, i.e. bandwidth application based on each communication can be made as mentioned above. This approach of bandwidth allocation based on connection makes the bandwidth fully belong to the current communication once the bandwidth is allocated, therefore, QoS can be guaranteed. As for the overhead bytes involved in signaling transmission, it is possible to use a certain byte or a combination of several bytes in the Section Overhead of SDH frame structure, such as D1~D3, D4~D12, or E1, etc. When a subscriber calls a TV center, establishes communications and demands for programs, the TV center server will transmit TV services to the subscriber through the bandwidth designated by the subscriber. At this time, the TV center can be treated as a remote subscriber that communicates with this subscriber.

The structure of the terminal processing unit in accordance with an embodiment of the embodiment of present invention may have other types, for example:

With development of FTTH application as well as subscribers' requirements on simplification of terminal equipment, a terminal processing unit will connect with one terminal that integrates video, audio and data services rather than connect with a plurality of terminal devices such as TV set, telephone set and computer, which can avoid complicated cable connection between traditional terminal units and terminal devices and save space and energy to a certain extent.

Usually, optical network units (ONU) or optical network terminals (ONT) that are based on APON (ATM Passive Optical Network), EPON (Ethernet Passive Optical Network) and GPON (Gigabit-capable Passive Optical Network) can be used as the terminal processing unit in the embodiment of present invention. The technical architectures of said optical network unit or optical network terminal have been defined and explained in detail in ITU-T G.983 (ITU, International Telecommunication Union), IEEE 802.3 ah (IEEE, Institute of Electrical and Electronics Engineers) and ITU-T G.984.

Similarly, the new-model integrated terminal processing unit that combines ONU or ONT with video, audio and data modules can also be used as the terminal processing unit of the embodiment of present invention.

The gateway unit in the embodiment of present invention is connected between the switch unit and other networks, implementing protocol conversion between the present switching network and other types of network, and thereby realizing the inter-working with other types of network. For instance, when the terminal processing unit in the present switching network initiates a call to an audio terminal of a PSTN network, after the audio and video services sent enter the gateway unit, the video service in the call will be separated and discarded, and only the audio portion flows into the audio terminal while, in the opposite direction, the service stream from the audio terminal to the terminal processing unit of the present switching network comprises only audio portion with null bytes filled in the position of video service.

Physical entity of the gateway unit can be integrated into the switch unit, and the control module can implement converting and harmonizing functions between different networks and protocols in a unified way.

Figure 8:
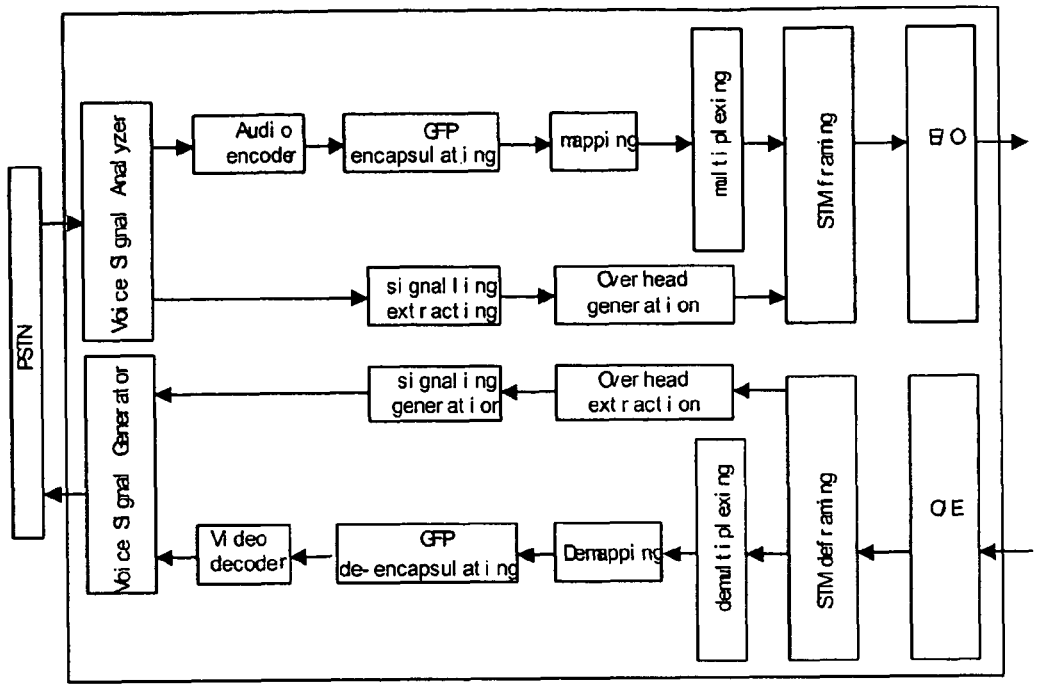
FIG. 8 is schematic diagram 2 of the architecture of the gateway unit in accordance with the embodiment of present invention.
Figure 9:
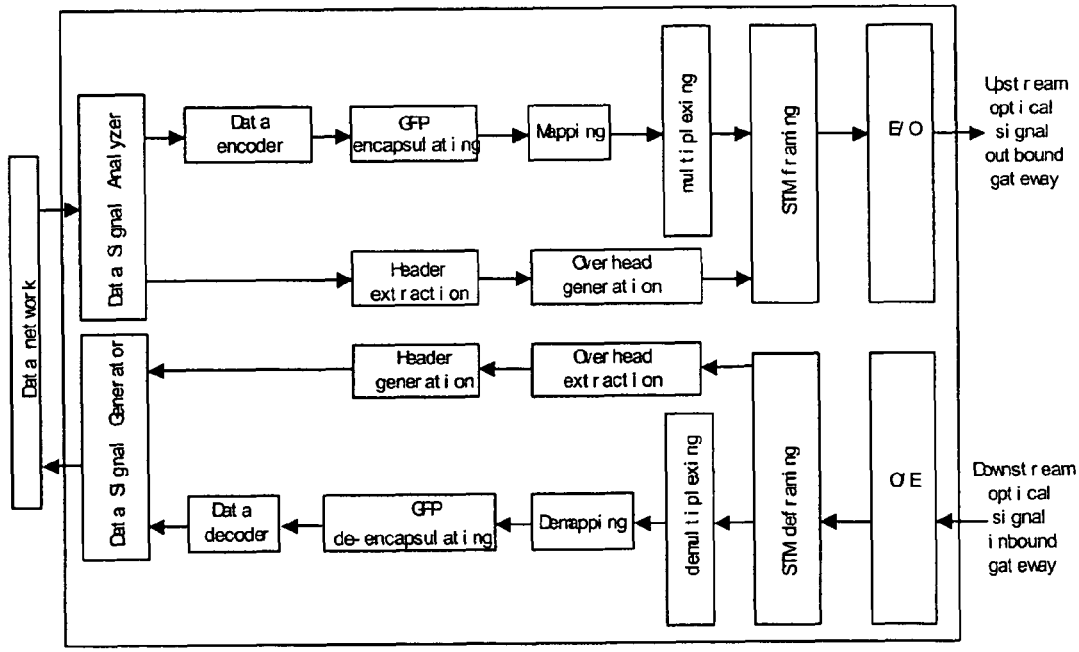
FIG. 9 is schematic diagram 3 of the architecture of the gateway unit in accordance with the embodiment of present invention.

When the optical fiber transmission system is connected with a traditional PSTN (Public Switching Telephone Network) or data network, the gateway unit is as shown in FIG. 8 and FIG. 9, comprising:

a signal processing module, generating signals required by external networks using the data sent by a gateway codec module and the control and management information sent by a gateway frame overhead processing module and sending out the signals, at the same time, receiving the signals from external networks, sending the data information therein to the gateway codec module, and sending the control and management information therein to the gateway overhead processing module;

When the optical fiber transmission system connects with a traditional PSTN, said signal processing module comprises a voice signal analyzer and a voice signal generator;

When the optical fiber transmission system connects with a traditional data network, said signal processing module comprises a data signal analyzer and a data signal generator;

a gateway codec module, receiving audio, video or data information sent by the signal processing module, encoding the information and then sending it to the gateway frame processing module, wherein different information corresponds to different encoder module, such as audio encoder module, data encoder module etc.; at the same time, receiving the data sent by the gateway frame processing module, decoding the data and then sending them to the signal processing module, wherein, similarly, different service information corresponds to different decoder module, such as audio decoder module, data decoder module etc.;

a gateway overhead processing module, receiving the control and management information sent by the signal processing module, extracting signaling and forming appropriate overhead and then sending it to the gateway frame processing module, meanwhile, receiving the overhead sent by the gateway frame processing module, extracting the overhead and forming appropriate signaling and then sending it to the signal processing module;

a gateway frame processing module, receiving the audio, video and data information sent by the gateway codec module and the overhead sent by the gateway overhead processing module, and sending the appropriate frame generated from the information and overhead to a gateway electric/optical signal processing module, which specifically comprises successive GFP encapsulating, mapping, and multiplexing of the audio, video and data information, and STM framing thereof together with the overhead before send the frame to the E/O module; at the same time, receiving the frame sent by the gateway electric/optical signal processing module, separating the information of the frame into appropriate audio, video and data information and overhead and sending the separated information and overhead to the corresponding gateway codec module and gateway overhead processing module, respectively, which specifically comprises, first, STM de-framing, i.e. de-composing the frame into appropriate overhead code block and audio, video and data information code block, wherein overhead is extracted from the overhead code block and appropriate signaling is generated and sent to the signal processing module while said audio, video and data information code block is sent to the gateway codec module after successive de-multiplexing, de-mapping and GFP de-encapsulating;

a gateway electric/optical signal processing module, comprising E/O module and O/E module, wherein the E/O module converts the received frame from the gateway frame processing module into an optical signal and sends the signal to the optical transmission unit while the O/E module receives the optical signal sent by the optical transmission unit, converts the optical signal into an electric signal and then sends the electric signal to the gateway frame processing module.

The gateway unit in the embodiment of present invention can be embedded in the switch unit.

As shown in FIG. 8, the working principle of the gateway unit in an embodiment of the embodiment of present invention is as follows:

The payloads and signaling within the voice signal coming from a PSTN are separated after the processing of the voice signal analyzer, and the signaling extraction module converts the signaling into overhead bytes while said payloads enter the audio encoder module for encoding, and then for GFP encapsulating, mapping, and multiplexing. The multiplexed code stream and the overhead bytes jointly constitute STM frame code stream, which flows out of the gateway unit (i.e. audio gateway) after electric-to-optical conversion in the E/O module, and flows into the optical fiber transmission system described in the embodiment of present invention. On the other hand, the downstream inbound gateway signal is appropriately processed by O/E conversion, STM de-framing, overhead extraction, de-multiplexing, de-mapping, GFP de-encapsulating, and audio decoding, and the signaling generation module converts the overhead bytes outputted from the overhead extraction module into the signaling of traditional voice signal. Then the signaling flows into the voice signal generator together with the audio signal outputted from the audio decoder module, and the output of the voice signal generator comes out of the gateway unit and goes into the traditional PSTN.

As shown in FIG. 9, the working principle of the gateway unit in another embodiment of the embodiment of present invention is as follows:

After the processing of the data signal analyzer, payloads (text of the message) and header within the data signal coming from a data network are separated. The header extraction module converts the header into overhead bytes while the payloads enter the data encoder module for encoding, and then for GFP encapsulating, mapping, and multiplexing. The multiplexed code stream forms STM frame code stream together with the overhead bytes. Then after E/O conversion, the code stream outflows from the data gateway unit and inflows into the optical fiber transmission system of the embodiment of present invention. On the other hand, after the downstream inbound gateway signal is appropriately processed by O/E conversion, STM de-framing, overhead extraction, de-multiplexing, de-mapping, GFP de-encapsulating, and data decoding, the header generation module converts the overhead bytes outputted from the overhead extraction module into the header of a traditional data signal, which flows into the data signal generator together with the signal outputted from the data decoder module. Then the outputted data signal outflows from the gateway unit and inflows into the traditional data network.

Figure 7:
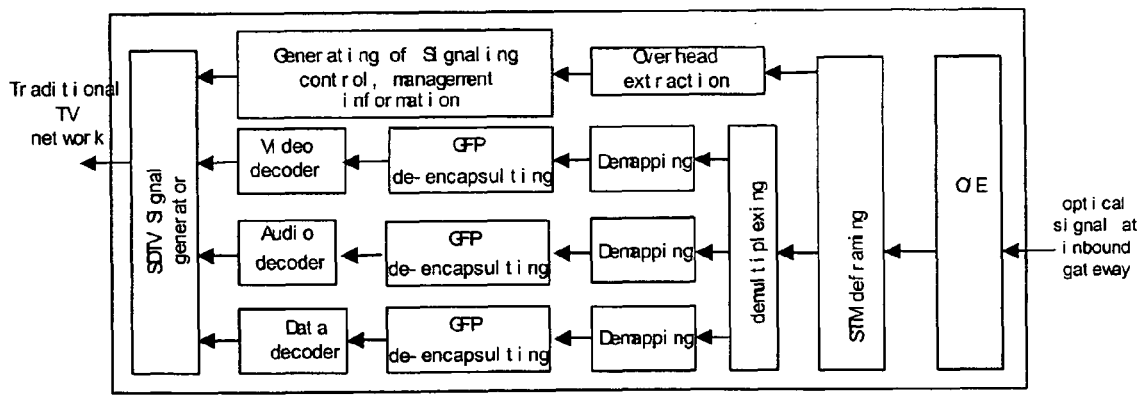
FIG. 7 is schematic diagram 1 of the architecture of the gateway unit in accordance with the embodiment of present invention.

The structure of the gateway unit in an embodiment of the embodiment of present invention is shown in FIG. 7.

Since the traditional TV service usually is a unilateral broadcasting service, there is only unilateral service flow through the video gateway. Each output code stream from the decode module enters the SDTV signal generator together with the signaling, control and management messages, which form the traditional TV signal, and the traditional TV signal then enters the traditional television network. The signal processing module is a SDTV (Standard Definition Television) signal generator.

Based on the optical fiber transmission system of this embodiment of invention, an optical fiber transmission method is provided, which comprises a transmitting procedure and a receiving procedure. Specifically, the transmitting procedure comprises:

Step 100: determining the type of data to be transmitted by UE, which usually comprises audio, video or data information, for instance, when a user picks up the phone and initiates a call, it means that the user desires to send out audio signals; if it is a video phone, video signals will be sent out together.

Step 101: defining the needed bandwidth resources through the module with a man-machine interface, or calling the bandwidth resources that is default in the system. Since optical fiber is used for transmission throughout the communication in the embodiment of present invention, abundant bandwidth resources makes it possible to assign appropriate bandwidth resources for each UE on demand.

On one hand, to obtain appropriate bandwidth resources, UE may define necessary bandwidth through the man-machine interface module provided by the terminal processing unit such that the UE could select appropriate bandwidth resources according to its needs. If the UE needs to send or receive video signals, it is necessary to choose a larger bandwidth, otherwise, smaller bandwidth may be selected.

On the other hand, the UE can call the default bandwidth resources in the system, of which the quantity can be configured according to different application cases. When the UE provides video service, a larger default bandwidth may be configured; for data service, smaller quantity of bandwidth resource may be configured.

Step 102: the signal codec module encoding the audio, video and data signals sent by the UE, and then sending the encoded signals to the terminal frame processing module.

Step 103: after receiving the encoded audio, video and data signals, the terminal frame processing module implementing unified encapsulating, mapping, multiplexing and framing of the signals, and then sending them to the terminal electric/optical signal processing module, i.e. putting the signals in one packet and sending the packet to the terminal electric/optical signal processing module.

Step 104: the terminal electric/optical signal processing module converting the frames sent by the terminal frame processing module into optical signals, and then sending the signals to the optical transmission unit;

Step 105: sending the optical signals that carry the audio, video and data signals to the switch unit through the optical transmission unit, i.e.

First, assigning special time slots for each optical network unit, then multiplexing the data to be sent in the assigned time slots and sending the data to the optical allocation unit, i.e. a passive optical splitter; converging the data sent from each optical network unit by the passive optical splitter, and finally sending the converged data to the switch unit through the optical line terminal that provides optical fiber interface;

Step 106: after the switch unit receiving the audio, video and data signals sent by the optical transmission unit, the adaptation module carrying out optical-to-electrical conversion, overhead extraction and de-multiplexing, and then sending the processed signals to the switching module and the control module;

Wherein, after receiving the code stream sent by the adaptation module, the switching module will determine destination of the audio, video and data signals according to the control and management information received by the control module, i.e. the control module will convert the control and management information received from the adaptation module into corresponding control signaling, and send it to the switching module so as to determine the transmitting destination of said audio, video and data signals as well as the size of the switching granularity according to the related control signaling and send the determined information to the downstream adaptation module in the switch unit;

the control module of the switch unit will control, according to commands of the subscriber, the switching module to select corresponding switching granularities, such as 64 Kbps, VC12, VC3, and VC4, for switching.

Step 107: the downstream adaptation module receiving the code stream sent by the switching module, which is initiated by the upstream adaptation module, and then multiplexing the stream; the frame processing module then generating the corresponding frame according to the overhead of the upstream adaptation module sent by the control module and sending the frame to the electric/optical signal processing module; after receiving said frame, the electric/optical signal processing module making electric-to-optical conversion and then sending it to the optical transmission unit.

The audio, video and data signals are transmitted between the switch unit and the optical transmission unit until reaching the appropriate receiving terminal, by then, the transmitting procedure is over.

The receiving procedure in the method according to the embodiment of present invention comprises the following steps:

Step 200, the switch unit multiplexing the audio, video and data signals to be sent, converting the multiplexed signals to optical signals and then sending the to the destination optical transmission unit via optical fiber;

Step 201, the optical transmission unit receiving the audio, video and data information to be sent to the corresponding UE, de-multiplexing the information and sending the de-multiplexed information to the terminal processing unit;

Specifically this step comprising:

sending, via the optical fiber interface of the optical line terminal, the audio, video and data information to the optical allocation unit, i.e. the passive optical splitter;

the passive optical splitter duplicating the signal sent by the optical line terminal into multiple identical signal, and then sending them to the optical network units;

each optical network unit receiving said audio, video and data information, and then sending the signal belonging to itself to the terminal processing unit.

Step 202, the terminal processing unit carrying out such processing as optical-to-electrical conversion and de-encapsulating according to the type of the signal, and then sending the data to the UE;

Specifically the processing comprising:

after receiving the signal sent by the optical transmission unit, the terminal electric/optical signal processing module in the terminal processing unit carrying out optical-to-electrical conversion and then sending the signal to the terminal frame processing module;

after receiving the frame sent by the terminal electric/optical signal processing module, the terminal frame processing module carrying out de-framing, de-multiplexing, de-mapping and de-encapsulating of the frame successively, and then sending the processed signal to the signal codec module;

after receiving said signal sent by the terminal frame processing module, the signal codec module decoding and then sending the signal to the corresponding UE; the UE receiving the decoded signal, and the receiving procedure is over.

The embodiment of present invention will be described in more detail hereinafter with reference to specific embodiments. Take the circuit switched communications between subscribers within a switch as an example and the signaling transmission and the processing mechanism and implementing method according to the embodiment of present invention are as follows.

When UE sends a communication request by such operation as picking up a phone, turning on the power for a video terminal, or clicking IE (browser), the transmission laser (i.e. terminal processing unit) at UE will be turned on, and the request is transmitted to the control module of the switch unit through the optical transmission unit and the adaptation module of the switch unit.

After detecting the request from the UE, the control module records the port number P1 of the UE, and searches in the "mapping list of address-port" stored in the control module, wherein the maintenance of said mapping list is usually carried out by personnel of network management, i.e. when a new terminal is connected to the network, the personnel of network management will add the port and address information of the terminal in the mapping list. After obtaining the corresponding address number A1, such as the telephone number, IP address, etc., the control module notifies the system whether it is ready through special bytes (for instance overhead bytes of SDH). Usually, different messages may be employed to represent busy and ready, respectively.

After receiving the message (for instance, a dialing tone) that indicates the system is ready, the UE may notify the control module of destination address A2 of the call through a specific means, such as ordinary dialing, inputting the IP address of callee, or even sending a voice calling of the name of the callee directly.

According to the destination address, the control module searches in the mapping list of address-port so as to get the port number P2 corresponding to the address, and meanwhile detects whether the port is free, if it is free, continues with the communication process, otherwise, sending the "destination port is busy" message to the calling party.

If the port is detected as free, the control module issues the prompting message, to instruct the subscriber to choose the bandwidth and the size of switching granularity that are needed for transmitting said audio, video and data information such that the bandwidth that needs to be assigned for the transmission of the audio, video and data information could be determined and the switching module in the switch unit could make appropriate switching.

The control module establishes a bi-directional connection between P1 and P2 according to demands of the subscriber;

Once any party requests to stop the communication through a specific means (for instance, hanging up the phone), the control module may send a prompt for re-confirmation of stopping the communication, if it is re-confirmed, delete the connection and the communication is ended.

The method in accordance with this embodiment of invention further comprises processing steps for receiving signals from external networks. The external networks refer to networks other than the optical fiber transmission network that is established based on the optical fiber transmission system provided by the embodiment of present invention, such as traditional CATV network, traditional ordinary telephone network, etc., The processing steps specifically comprises:

The signal processing module receiving signals sent by an external network and making analysis and processing of the signals such that the signals are separated into the service information as well as the control and management information and are sent to the gateway codec module and gateway overhead processing module, respectively;

After encoding said service information, the gateway codec module sending the encoded service information to the gateway frame processing module, meanwhile, the gateway overhead processing module determining and generating corresponding overhead according to said control and management information sent by the signal processing module, and then sending the overhead to the gateway frame processing module;

After receiving the encoded service information and corresponding overhead, respectively, the gateway frame processing module carrying out encapsulating, mapping, multiplexing and framing successively, and then sending the resulting frames to the gateway electric/optical signal processing module;

After electric-to-optical conversion of the frames, the gateway electric/optical signal processing module sending the processed frames to the optical transmission unit, and thus the optical fiber transmission system can receive audio, video and data information sent by an external network and communicate with the external network.

In order to communicate with the external network properly, the embodiment of present invention further includes processing steps for sending signals to an external network, which comprise, After receiving the frame sent by the optical transmission unit that bears corresponding data, the gateway electric/optical signal processing module carrying out the optical-to-electrical conversion, and then sending the converted signal to the gateway frame processing module;

After carrying out de-framing, de-multiplexing, de-mapping and de-encapsulating successively, the gateway frame processing module sending the result to the gateway codec module and the signal processing module;

After decoding the service information received from the gateway frame processing module, the gateway codec module sending the decoded information to the signal processing module, and the signal processing module sending the decoded service information to the external network according to the control and management information sent by the gateway frame processing module.

The invention claimed is:

1. An optical fiber transmission system, comprising:
   a terminal processing unit including a signal codec module, a terminal frame processing module, and a terminal electric/optical signal processing module,
   an optical transmission unit, and
   a switch unit with input and output thereof connected with the optical transmission unit, respectively,
   wherein the terminal processing unit, connecting with UE (user equipment), used for encapsulating and converting the signal of the UE to be transmitted into an optical signal and sending the optical signal to the optical transmission unit, as well as for de-encapsulating the signal from the optical transmission unit and sending the signal to the UE;
   wherein the optical transmission unit, connecting with the terminal processing unit and the switch unit respectively, used for multiplexing the encapsulated signal sent by the terminal processing unit and sending the multiplexed signal to the switch unit via an optical fiber; as well as for de-multiplexing the signal transmitted from the switch unit via an optical fiber and sending the de-multiplexed signal to the terminal processing unit;
   wherein the switch unit, connecting with the optical transmission unit, used for receiving the multiplexed signal from the optical transmission unit at the input side thereof, de-multiplexing the signal, determining the transmission destination of the signal according to the type of the signal and sending out the signal; and at the same time for multiplexing the signal that needs to be transmitted to the optical transmission unit at the output side thereof, converting the multiplexed signal to an optical signal and sending out the signal;
   wherein the signal codec module encodes various signals sent by UE and sends a digital signals to the terminal frame processing module; at the same time, decodes a digital signals sent by the terminal frame processing module and sends the decoded signals to the UE;
   wherein the terminal frame processing module receives the digital signals sent by the signal codec module, encapsulates the signals and sends the encapsulated signals to the terminal electric/optical signal processing module; meanwhile, de-encapsulates the electric signal sent by the terminal electric/optical signal processing module and then sends the signal to the signal codec module; and
   wherein the terminal electric/optical signal processing module converts the optical signal sent by an optical transmission unit into an electric signal and sends the electric signal to the terminal frame processing module; meanwhile, converts the electric signal sent by the terminal frame processing module into an optical signal and sends the optical signal to the optical transmission unit.

2. The optical fiber transmission system according to claim 1, wherein the signal codec module comprises an encoder module and a decoder module;
   the terminal frame processing module comprises a GFP (generic framing protocol) encapsulating module, a mapping module, a multiplexing module and a STM (synchronous transmission mode) framing module connected successively as well as a STM (synchronous transmission mode) de-framing module, a de-mapping module, a de-multiplexing module and a GFP (generic framing protocol) de-encapsulating module connected successively; and
   the terminal electric/optical signal processing module comprises an electric-to-optical conversion module and an optical-to-electric conversion module; wherein
   the encoder module receives a signal from UE and encodes the signal before sending to the GFP encapsulating module; the electric-to-optical conversion module converts a frame from the STM framing module into an optical signal and sends the signal to the optical transmission unit;
   the decoder module decodes a de-encapsulated signal from the GFP de-encapsulating module and sends the signal to the UE; the optical-to-electric conversion module converts the optical signal from the optical transmission unit into an electric signal and sends the converted signal to the STM (synchronous transmission mode) de-framing module.

3. The optical fiber transmission system according to claim 2, wherein the encoder module comprises a video encoder module, an audio encoder module, and a data encoder module; the GFP encapsulating module comprises a video GFP encapsulating module, an audio GFP encapsulating module, and a data GFP encapsulating module; the mapping module comprises a video mapping module, an audio mapping module, and a data mapping module; wherein the output of each kind of encoder module connects with the corresponding GFP encapsulating module and corresponding mapping module successively, and the output of each kind of mapping module connects with the multiplexing module;

the decoder module comprises a video decoder module, an audio decoder module, and a data decoder module; the GFP de-encapsulating module comprises a video GFP de-encapsulating module, an audio GFP de-encapsulating module, and a data GFP de-encapsulating module; the de-mapping module comprises a video de-mapping module, an audio de-mapping module, and a data de-mapping module; wherein the output of each kind of de-mapping module connects with the corresponding GFP de-encapsulating module and corresponding decoder module successively, and input of each kind of de-mapping module connects with the de-multiplexing module.

4. The optical fiber transmission system according to claim 2, wherein the terminal processing unit further comprises a man-machine interface module, a control and management information processing module, and a terminal overhead processing module, wherein the man-machine interface module receives a operation command from the UE and sends the command to the control and management information processing module; meanwhile receives the control and management message from the management information processing module and sends the information to the UE;

the control and management information processing module receives the operation command from the man-machine interface module, generates appropriate control and management messages and sends the messages to the terminal overhead processing module; meanwhile, receives control and management messages from the terminal overhead processing module, and interprets the messages before sending the messages to the man-machine interface module; and the terminal overhead processing module receives the control and management messages from the control and management information processing module, generates appropriate frame overheads and sends the overheads to the terminal frame processing module; at the same time, receives the frame overheads from the terminal framing module, extracts the control and management information and then sends the information to the control and management information processing module.

5. The optical fiber transmission system according to claim 4, wherein the terminal overhead processing module comprises an overhead generation module and an overhead extraction module, wherein the input of the overhead generation module is connected with the control and management information processing module while the output thereof is connected with the STM framing module, and the input of the overhead extraction module is connected with the STM framing module while the output thereof is connected with the control and management information processing module.

6. The optical fiber transmission system according to claim 1, wherein the terminal processing module is an optical terminal;

or integrated video, audio and data processing terminal;

or an ONU (Optical network unit) or an ONT (Optical Network Terminal) based on an APON (ATM Passive Optical Network), an EPON (Ethernet Passive Optical Network) or a GPON (Gigabit-capable Passive Optical Network) or based on Ethernet.

7. The optical fiber transmission system according to claim 1, wherein the optical transmission unit comprises optical network units, optical allocation units, and optical line terminals, wherein the optical network unit, connecting with the terminal processing unit, receives the signal from the terminal processing unit to be transmitted and sends the signal to the optical allocation unit; meanwhile, receives a signal from the optical allocation unit and sends the signal to the terminal processing unit;

the optical allocation unit, connecting between the optical network unit and optical line terminal, is used for converging the signals from the optical network units to be transmitted and sending the converged signal to one optical line terminal; meanwhile, for receiving the signal from the optical line terminal and distributing the signal to each of the optical network units;

the optical line terminal, connecting between the switch unit and the optical allocation unit, is used for interaction of signals between the optical allocation unit and the switch unit.

8. The optical fiber transmission system according to claim 1, wherein the optical transmission unit is based on PON (Passive Optical Network), CWDM (Coarse Wave Division multiplexing), DWDM (Dense Wave Division Multiplexing), UWDM (Ultra-dense Wave Division multiplexing) or direct optical fiber connection.

9. The optical fiber transmission system according to claim 1, wherein the switch unit comprises an adaptation module, a control module, a switching module, wherein the adaptation module, connecting with the optical transmission unit, receives the signal from the optical transmission unit, makes rate/format processing of the signal and then sends the signal to the switching module and sends a control and management message in the signal to the control module; at the same time, makes rate/format processing of the signal from the switching module and then sends the processed signal to the optical transmission unit;

the control module receives the control and management message from the adaptation module, and carries out control and management of the switching process of the switching module based on the received message;

the switching module determines the destination of the signal from the adaptation module according to the control and management by the control module, and sends out the signal.

10. The optical fiber transmission system according to claim 9, wherein the adaptation module comprises an adaptation overhead processing module, an adaptation multiplexing/de-multiplexing module, an adaptation frame processing module, and an adaptation electric/optical signal processing module, wherein the overhead processing module, after extracting a overhead sent by the frame processing module, sends the overhead to the control module; meanwhile, converts the control and management message that is generated by the control module according to an upstream adaptation module into overhead bytes, and then sends the overhead bytes to the frame processing module;

the multiplexing/de-multiplexing module receives a payload in the data sent from the frame processing module, de-multiplexes the payload into a code stream before sending it to the switching module; meanwhile, receives the code stream sent from an upstream adaptation module in the switch unit via the switching module, and multiplexes the code stream before sending it to the frame processing module;

the frame processing module receives the overhead bytes from the overhead processing module as well as the multiplexed payload sent by the multiplexing/de-multiplexing module, generates appropriate frames and sends the frames to the electric/optical signal processing module; meanwhile, decomposes the frames from the electric/optical signal processing module into overhead and payload and sends the overhead and payload to the overhead processing module and the multiplexing/de-multiplexing module, respectively;

electric/optical signal processing module receives the frame from the frame processing module, converts the frame into optical signal and then sends the signal to the optical transmission unit; at the same time, receives the optical signal from the optical transmission unit, converts the signal into an electric signal and then sends the signal to the frame processing module.

11. The optical fiber transmission system according to claim 10, wherein the overhead processing module comprises an overhead extraction module and an overhead generation module; the multiplexing/de-multiplexing module comprises a multiplexing module and a de-multiplexing module; the frame processing module comprises a STM framing module and a STM de-framing module; the electric/optical signal processing module comprises an electric-to-optical conversion module and an optical-to-electric conversion module; wherein the optical-to-electric conversion module converts the optical signal from the optical transmission unit into an electric signal and sends the signal to the STM de-framing module; the STM de-framing module separates the electric signal into overhead and payload, and sends the overhead to the overhead extraction module and sends the payload to the de-multiplexing module;

the overhead extraction module extracts the overhead bytes and sends the overhead to the control module; the de-multiplexing module, under control of the control module, de-multiplexes the payload into a code stream and sends the code stream to the switching module;

the overhead generation module converts the control and management message from the control module according to an upstream adaptation module into an overhead, and then sends the overhead to the STM framing module; the multiplexing module receives a code stream from the upstream adaptation module in the switch unit sent by the switching module, multiplexes the code stream and then sends the multiplexed code stream to the STM framing module; the STM framing module receives the overhead from the overhead generation module as well as the multiplexed code stream sent by the multiplexing module, generates appropriate frames and then sends the frames to the electric-to-optical conversion module; and the electric-to-optical conversion module connects with the optical transmission module.

12. The optical fiber transmission system according to claim 10, wherein the control module comprises an overhead interpreting module, a signalling and connection control module, a destination-port overhead processing module, wherein the overhead interpreting module receives the overhead sent by the overhead processing module, interprets the overhead and then sends it to the signalling and connection control module;

the signalling and connection control module, after receiving the interpreted overhead sent by the overhead interpreting module, determines an appropriate control signalling which enters the switching module together with the output of the multiplexing/de-multiplexing module, and meanwhile, sends the interpreted overhead bytes to the destination-port overhead processing module;

the destination-port overhead processing module, after receiving the interpreted overhead sent by the signalling and connection management module, generates an overhead of the destination port, and then sends the overhead to the frame processing module in the downstream adaptation module.

13. The optical fiber transmission system according to claim 1, further comprising a gateway unit connecting between the switch unit and other networks for use in implementing protocol conversion between networks of different types.

14. The optical fiber transmission system according to claim 13, wherein the gateway unit comprises a signal processing module, a gateway codec module, a gateway overhead processing module, a gateway frame processing module, and a gateway electric/optical signal processing module; wherein the signal processing module generates a signal needed by external networks using the signal from the gateway codec module and a control and management message from the gateway overhead processing module, and sends out the generated signal; meanwhile, receives the signal from external networks, sends a service information in the signal to the gateway codec module and sends the control and management message in the signal to the gateway overhead processing module;

the gateway codec module receives and encodes the service information from the signal processing module, and then sends the encoded information to the gateway frame processing module; at the same time, receives and decodes the service information from the gateway frame processing module, and then sends the decoded information to the signal processing module;

the gateway overhead processing module receives the control and management message from the signal processing module, extracts the signalling and generates corresponding overhead before sending the overhead to the gateway frame processing module; meanwhile, receives an overhead from the gateway frame processing module, extracts overhead and generates corresponding signalling before sending the signalling to the signal processing module;

the gateway frame processing module, after receiving the service information from the gateway codec module and the overhead from the gateway overhead processing module, generates a corresponding frame and then sends the frame to the gateway electric/optical signal processing module; at the same time, decomposes a received frame sent by the gateway electric/optical signal processing module into a corresponding service information and overhead, and then sends the service information and overhead to the gateway codec module and gateway overhead processing module respectively;

the gateway electric/optical signal processing module converts the received frame sent by the gateway frame processing module into an optical signal, and then sends the signal to the optical transmission unit; at the same time, converts the received optical signal sent by the optical transmission unit into an electric signal, and then sends the signal to the gateway frame processing module.

15. The optical fiber transmission system according to claim 14, wherein the signal processing module comprises a signal analyzer and a signal generator; the gateway codec module comprises an encoder module and a decoder module; the gateway overhead processing module comprises an extraction module, a generation module, a gateway overhead generation module, and a gateway overhead extraction module; the gateway frame processing module comprises a GFP encapsulating module, a mapping module, a multiplexing module, a STM framing module, a GFP de-encapsulating module, a de-mapping module, a de-multiplexing module, and a STM de-framing module; and the gateway electric/optical signal processing module comprises a gateway electric-to-optical conversion module and a gateway optical-to-electric conversion module; wherein the signal analyzer sends the service information in the signal from the external network to the encoder module and sends the control and management message in the signal to the extraction module; the encoder module, the GFP encapsulating module, the mapping module, and the multiplexing module are connected in order; the extraction module is connected with the overhead generation module; the STM framing module receives the service information from the multiplexing module and the overhead from the overhead generation module, generates a corresponding frame and then sends the frame to the electric-to-optical conversion module; the electric-to-optical conversion module converts the frame from the STM framing module into an optical signal, and then sends the signal to the optical transmission unit;

the optical-to-electric conversion module converts the received optical signal sent by the optical transmission unit into an electric signal, and then sends the signal to the STM de-framing module; the STM de-framing module decomposes the frame from the optical-to-electric conversion module into corresponding service information and overhead, and then sends the information and overhead to the de-multiplexing module and the overhead extraction module, respectively; the de-multiplexing module, the de-mapping module, the GFP de-encapsulating module, and a decoder module are connected in order; the overhead extraction module is connected with the generation module; the signal generator generates a signal needed by the external network according to the service information from the decoder module and the control and management message from the generation module before sending out the signal.

16. The optical fiber transmission system according to claim 15, wherein, when the network connected with the gateway unit is a traditional PSTN (Public Switched telephony network), the signal analyzer is a voice signal analyzer and the signal generator is a voice signal generator;

when the network connected with the gateway unit is a traditional data network, the signal analyzer is a data signal analyzer and the signal generator is a data signal generator.

17. The optical fiber transmission system according to claim 13, wherein the network connected with the gateway unit is a traditional television network, and the gateway unit comprises a SDTV (Standard Definition TV) signal generator, a generation module for generating signalling as well as control and management information, an overhead extraction module, a video decoder module, an audio decoder module, a data decoder module, a video GFP de-encapsulating module, an audio GFP de-encapsulating module, a data GFP de-encapsulating module, a video de-mapping module, an audio de-mapping module, a data de-mapping module, a de-multiplexing module, a STM de-framing module and an optical-to-electric conversion module, wherein the optical-to-electric conversion module converts the received optical signal sent by the optical transmission unit into an electric signal, and then sends the electric signal to the STM de-framing module; the STM de-framing module decomposes a frame from the optical-to-electric conversion module into corresponding data information and overhead, and then sends the data information and the overhead to the de-multiplexing module and the overhead extraction module, respectively; the de-multiplexing module is connected with input of the video de-mapping module, the audio de-mapping module, and the data de-mapping module respectively; output of each kind of de-mapping module is connected with the corresponding GFP de-encapsulating module and decoder module in order, respectively; the overhead extraction module is connected with the generation module for generating signalling, control and management information; and the SDTV signal generator generates the signal needed by the external network according to the service information from each kind of decoder module and the control and management message from the generation module for generating signalling, control and management information.

18. The optical fiber transmission system according to claim 13, wherein the gateway unit can be embedded in the switch unit.

19. An optical fiber transmission method, comprising a transmitting process from UE to a remote end and a receiving process from a remote end to UE, wherein the transmitting process comprises:

A, a terminal processing unit encoding and encapsulating a signal from the UE, converting the signal into an optical signal and then sending to an optical transmission unit;

B, the optical transmission unit multiplexing the optical signal and then sending the signal to a switch unit via optical fiber; and C, the switch unit converting the multiplexed signal into an electric signal and de-multiplexing the signal, determining a destination optical transmission unit of the de-multiplexed signal according to the type of the signal and sending the signal; and wherein the receiving process comprises:

D, the switch unit multiplexing the signal to be sent to the optical transmission unit, converting the multiplexed signal to an optical signal and then sending the signal to the destination optical transmission unit via optical fiber;

E, the optical transmission unit de-multiplexing the optical signal from the switch unit, and then sending the signal to the terminal processing unit; and F, the terminal processing unit converting the optical signal from the optical transmission unit into an electric signal, de-encapsulating and decoding the electric signal based on the type of the signal, and then sending the signal to the UE.

20. The optical fiber transmission method according to claim 19, wherein:

Step A further comprises:

A1, determining the situation of the signal from UE;

A2, defining necessary bandwidth resources or calling the default bandwidth resource of the system, and at the same time determining the size of switching granularity adopted in the switch unit;

in step A, the step of encapsulating the signal from UE comprises: successively encapsulating, mapping, multiplexing the service signal from UE, then framing the multiplexed signal and an overhead from the UE generated by a control and management module; and in step F, the step of de-encapsulating the electric signal based on the type of the signal comprises: de-framing the electric signal to obtain an overhead and a payload, extracting the overhead bytes, then generating a control and management message; successively de-multiplexing, de-mapping and de-encapsulating the payload.

21. The optical fiber transmission method according to claim 20, wherein:
the signal from UE comprises video signal, audio signal, and data signal,
the step of encapsulating, mapping, multiplexing the service signal from the UE further comprises: encapsulating and mapping each kind of signal, respectively and then multiplexing each kind of mapped signal together; and
the step of de-multiplexing, de-mapping, and de-encapsulating the payload further comprises: de-multiplexing the payload to generate video signal, audio signal, and data signal, and de-mapping, and de-encapsulating each kind of signal, respectively.

22. The optical fiber transmission method according to claim 19, wherein the step B further comprises
B1, assigning a time slot to each optical network unit, respectively, an optical network unit multiplexing the encapsulated signal to the assigned time slot, and then sending the time slot to an optical allocation unit;
B2, the optical allocation unit converging the signals sent from each optical network unit, and then sending the converged signal to an optical line terminal;
B3, sending the converged signal to the switch unit through an optical fiber interface provided by the optical line terminal;
the step E further comprises,
E1, sending the signal through the optical fiber interface of the optical line terminal to the optical allocation unit;
E2, the optical allocation unit duplicating the signal from the optical line terminal into several unified signals, and then sending them to each optical network unit, respectively;
E3, the optical network unit sending the signal to the terminal processing unit.

23. The optical fiber transmission method according to claim 19, wherein, in step C, the step of multiplexing, determining the destination optical transmission unit for transmitting the multiplexed signal and sending further comprises:
de-framing the converted electric signal into an overhead and a payload, extracting the overhead bytes from the overhead, interpreting the overhead bytes, and generating a control and management message; at the same time, de-multiplexing the payload to a code stream, and sending the code stream to the destination optical transmission unit according to the control and management message;
in step D, the step of multiplexing the signal to be sent to the optical transmission unit, converting the multiplexed signal into an optical signal and then sending the signal to the destination optical transmission unit via optical fiber further comprises: converting the control and management message from the upstream into an overhead, multiplexing the code stream of the signal from the upstream, and framing the code stream and the overhead.

24. The optical fiber transmission method according to claim 19, further comprising:
when receiving a signal from a traditional PSTN or a data network,
H, a gateway unit analyzing and processing the signal from the network and decomposing the signal into a service signal and a control and management message, encapsulating a payload generated from the service signal and a overhead extracted and generated from the control and management message, then converting the encapsulated signal into an optical signal, and sending the signal to the optical transmission unit;
when sending a signal to a traditional PSTN or a data network,
I, the gateway unit converting the optical signal from the optical transmission unit into an electric signal, de-encapsulating the electric signal into the payload and the overhead, generating the signal needed by the network from the payload based on the control and management message extracted and generated from the overhead and sending the signal to the network.

25. The optical fiber transmission method according to claim 24, wherein:
the step of encapsulating further comprises successively encapsulating, mapping and multiplexing the service signal, and then framing the multiplexed payload and the overhead extracted and generated from the control and management message; and
the step of de-encapsulating further comprises: de-framing the converted electric signal into the payload and the overhead; generating the control and management message from the overhead; at the same time, successively de-multiplexing, de-mapping, and de-encapsulating the payload.

26. The optical fiber transmission method according to claim 19, further comprising:
when transmitting a signal to a traditional television network,
a gateway unit converting the optical signal from the optical transmission unit into an electric signal, de-framing the converted electric signal into a payload and an overhead; generating the control and management message from the overhead; at the same time, de-multiplexing the payload into a video payload, an audio payload, and a data payload, and then successively de-mapping, de-encapsulating, and decoding each kind of de-multiplexed payload, generating the signal needed by the network from the payload and sending the signal to the traditional television network based on the control and management message extracted and generated from the overhead.

27. A terminal processing unit for use in an optical fiber transmission system, comprising a signal codec module, a terminal frame processing module, a terminal electric/optical signal processing module, a control and management information processing module, and a terminal overhead processing module, wherein
the signal codec module encodes various signals sent by UE and sends a digital signals to the terminal frame processing module; at the same time, decodes a digital signals sent by the terminal frame processing module and sends the decoded signals to the UE;
the terminal frame processing module receives the digital signals sent by the signal codec module, encapsulates the signals and sends the encapsulated signals to the terminal electric/optical signal processing module; meanwhile, de-encapsulates the electric signal sent by the terminal electric/optical signal processing module and then sends the signal to the signal codec module;

the terminal electric/optical signal processing module converts the optical signal sent by an optical transmission unit into an electric signal and sends the electric signal to the terminal frame processing module; meanwhile, converts the electric signal sent by the terminal frame processing module into an optical signal and sends the optical signal to the optical transmission unit, the control and management information processing module generates a corresponding control and management message and sends the message to the terminal overhead processing module; meanwhile, receives a control and management message sent by the terminal overhead processing module;

the terminal overhead processing module further comprises an overhead generation module and an overhead extraction module; the input of the overhead generation module is connected with the control and management information processing module, the output of the overhead generation module is connected with the terminal frame processing module; the input of the overhead extraction module is connected with the terminal frame processing module, and the output of an overhead extraction module is connected with the control and management information processing module.

28. The terminal processing unit according to claim 27, wherein the signal codec module comprises an encoder module and a decoder module;

the terminal frame processing module comprises a GFP (generic framing protocol) encapsulating module, a mapping module, a multiplexing module and a STM (synchronous transmission mode) framing module connected successively in order; and an STM (synchronous transmission mode) de-framing module, a de-mapping module, a de-multiplexing module and a GFP (generic framing protocol) de-encapsulating module connected successively in order;

the terminal electric/optical signal processing module comprises an electric-to-optical conversion module and an optical-to-electric conversion module; wherein the encoder module receives a signal from UE, encodes the signal and sends the encoded signal to the GFP encapsulating module; the electric-to-optical conversion module converts the frame sent by the STM framing module into an optical signal and sends the optical signal to the optical transmission unit;

the decoder module decodes a de-encapsulated signal sent by the GFP de-encapsulating module and sends the decoded signal to the UE; the optical-to-electric conversion module converts the optical signal sent by the optical transmission unit into an electric signal and sends the electric signal to the STM (synchronous transmission mode) de-framing module.

29. The terminal processing unit according to claim 28, wherein the encoder module comprises a video encoder module, an audio encoder module, and a data encoder module; the GFP encapsulating module comprises a video GFP encapsulating module, an audio GFP encapsulating module, and a data GFP encapsulating module; the mapping module comprises a video mapping module, an audio mapping module, and a data mapping module; the output for each kind of encoder module connects with the corresponding GFP encapsulating module and mapping module in order, and the output of each kind of mapping module connects with the multiplexing module;

the decoder module comprises a video decoder module, an audio decoder module, and a data decoder module; the GFP de-encapsulating module comprises a video GFP de-encapsulating module, an audio GFP de-encapsulating module, and a data GFP de-encapsulating module; the de-mapping module comprises a video de-mapping module, an audio de-mapping module, and a data de-mapping module; the output of each kind of de-mapping module connects with the corresponding GFP de-encapsulating module and decoder module in order, and the input of each kind of de-mapping module connects with the de-multiplexing module.

30. The terminal processing unit according to claim 27, further comprising a man-machine interface module, wherein the man-machine interface module forwards an operation command sent by the UE to the control and management information processing module; meanwhile, receives and forwards the control and management message from the management information processing module to the UE;

the control and management information processing module, after receiving the operation command sent by the man-machine interface module; after receiving the control and management message sent by the terminal overhead processing module, interprets the message and then sends the interpreted message to the man-machine interface module;

the terminal overhead processing module receives the control and management message from the control and management information processing module, generates a corresponding overhead and sends the overhead to the terminal frame processing module; at the same time, extracts the control and management message and then sends the message to the management information processing module.

* * * * *

UNITED STATES PATENT AND TRADEMARK OFFICE
CERTIFICATE OF CORRECTION

PATENT NO. : 7,734,177 B2
APPLICATION NO. : 10/565850
DATED : June 8, 2010
INVENTOR(S) : Shumiao Jiang It is certified that error appears in the above-identified patent and that said Letters Patent is hereby corrected as shown below:

Item (56) References Cited, Other Publications, add --International Search Report, PCT/CN2004/000866 dated November 4, 2004, 4 pages.--;

Column 28, Claim 17, line 23, change "the" to read --a--;

Column 29, Claim 23, line 52, change "the" to read --an--.

Signed and Sealed this

Twelfth Day of October, 2010

David J. Kappos
*Director of the United States Patent and Trademark Office*